UNITED STATES PATENT OFFICE 2,424,003

METHOD FOR THE PRODUCTION OF RIBOFLAVIN BY CANDIDA FLARERI

Fred W. Tanner, Jr., and James M. Van Lanen, Peoria, Ill., assignors to United States of America, as represented by the Secretary of Agriculture No Drawing. Application December 8, 1944, Serial No. 567,298

9 Claims. (Cl. 195—92)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to the production of riboflavin (vitamin $B_2$) by fermentation methods and is more particularly concerned with increases in the yield of riboflavin produced.

We have found that certain yeast organisms under controlled conditions of fermentation are capable of producing riboflavin in amounts far greater than are known in the prior art under any fermentation procedures.

In general, our process comprises the preparation of a growth medium containing one or more fermentable sugars, assimilable nitrogen, biotin, non-ferrous inorganic salts, and less than 10.3 micrograms of iron per 100 cc. of medium, and inoculating it with an organism of the genus Candida. Fermentation is preferred to proceed under aerobic conditions until a maximum amount of riboflavin is produced, which is then recovered in the usual manner well known in the art.

The control of the iron content is critical. Other investigators in the prior art have attempted to increase the production of riboflavin by controlling the iron content, but the quantities used are entirely out of the range of our invention, and the results obtained are in no way comparable to that obtained by our process. Also, the organisms employed in the prior art wherein attempts were made to control iron content are different from that of our invention.

Previous work on the production of riboflavin utilizing yeast of the genus Candida does not take into consideration the iron content of the medium, and results of an unexplained nature have been obtained by the use of various ingredients and different quantities of inoculum.

In the genus Candida, we have found that the species *guilliermondia* and *flareri* are preferred, although other species may be employed.

In the following table, there are tabulated the results of three experiments, each experiment comprising a culture medium containing various concentrations of iron. In the first experiment, a specific strain of *C. guilliermondia* was used, and, in the second experiment, a different strain of the same species was employed. In the third experiment, *C. flareri* was used. In all these experiments, the culture or basal medium was prepared by dissolving in 200 cc. of $H_2O$, 0.5 gram of $KH_2PO_4$, 0.5 gram $MgSO_4.7H_2O$, 2.0 grams urea, 2.0 grams asparagin, 1.0 microgram biotin (free acid), and 40 grams glucose. To the basal medium thus prepared, 10 milligrams of 8-hydroxoquinoline was added that had been first dissolved in about 2 cc. of chloroform, and the mixture was shaken vigorously in a separatory funnel. The funnel was then allowed to stand until the chloroform settled, which was then withdrawn. Fresh chloroform was added to the mixture, which was again shaken vigorously, and the mixture allowed to settle to separate the chloroform, which was removed. This process was repeated with the addition of 8-hydroxoquinoline in alternate extractions with the chloroform until the chloroform layer settling out appeared to be colorless, indicating that substantially all the iron had been removed. This condition indicates that not more than 0.3 microgram of iron per 100 cc. of the medium are present. (Iron below this concentration cannot be detected quantitatively by conventional iron determination techniques.) Where concentrations of iron were desired above this amount, as indicated in the table, additional amounts were added to the medium following the above-mentioned treatment with chloroform and 8-hydroxoquinoline. The basal medium was then placed in a vessel which was unable to contribute iron to the medium, and water, which had been triply distilled to remove any iron, was added to make up one liter. The medium was then distributed in 100 cc. portions among ten 500 cc. Erlmeyer flasks and sterilized by heating at 126° C. for about 15 minutes. After cooling, each portion was inoculated with a suspension of the yeast cells which had been previously washed by centrifugation with triply distilled water in order to remove loosely held iron from the cells. The inoculated portions were then incubated at 30° C. under aerobic conditions. It is preferable to continuously agitate the inoculated medium and to ameliorate the aerobic conditions by aeration. These preferred conditions result in greater yields of riboflavin and much more rapid rates of production.

Table

| Culture | Iron concentration μg. Fe per 100 cc. | Dry wt. of yeast g. per 100 cc. | Dry wt. of cell free residue g. per 100 cc. | Riboflavin μg. per cc. |
|---|---|---|---|---|
| Candida guilliermondia (NRRL 488). | 0.0– 0.3 | 0.27 | 0.45 | 108.0 |
|  | 0.5– 0.8 | 0.57 | 0.67 | 123.0 |
|  | 1.0– 1.3 | 0.66 | 0.56 | 120.0 |
|  | 10.0–10.3 | 0.89 | 0.26 | 7.2 |
|  | 50.0–50.3 | 0.92 | 0.19 | 3.2 |
| Candida guilliermondia (NRRL 324). | 0.0– 0.3 | 0.21 | 0.37 | 107.0 |
|  | 0.5– 0.8 | 0.67 | 0.33 | 125.0 |
|  | 1.0– 1.3 | 0.61 | 0.33 | 157.0 |
|  | 10.0–10.3 | 0.89 | 0.35 | 16.5 |
|  | 50.0–50.3 | 0.82 | 0.19 | 10.6 |
| Candida flareri (NRRL 245). | 0.0– 0.3 | 0.42 | 1.30 | 195.0 |
|  | 0.5– 0.8 | 0.49 | 0.75 | 216.0 |
|  | 1.0– 1.3 | 0.55 | 0.72 | 216.0 |
|  | 10.0–10.3 | 1.12 | 0.28 | 8.9 |
|  | 50.0–50.3 | 1.31 | 0.52 | 4.1 |

The results indicated in the above table are all based on a 7-day incubation period. However, the increase in yield of riboflavin beyond the 5th day did not appear to be marked, and incubation periods beyond 7 days would not ordinarily result in a substantial increase in the yield, if any.

The following examples will further illustrate this invention:

Forty grams of glucose was dissolved in one liter of distilled water which was then stripped of iron by the use of an ion exchange material. This was accomplished by passing the glucose solution through a column of resinous material, Nalcite MX. ("Nalcite iron remover" and Nalcite AX may also be used.) To the effluent is then added 0.5 gram $KH_2PO_4$, 0.5 gram $MgSO_4.7H_2O$, 2.0 grams urea, 2.0 grams asparagin, 1.0 microgram biotin (free acid). The acidity of the resulting solution is then adjusted with an alkali, such as sodium hydroxide, to pH 4.5 to 5.5, preferably 5.0. The resulting solution was then inoculated with C. guilliermondia (NRRL 324) in the same manner as the preceding example, and then incubated at 30° C. At the end of 3 days, the average riboflavin content was 25.3 micrograms per milliliter; at the end of 5 days, the riboflavin content averaged 85.3 micrograms per cc. and at the end of 7 days the riboflavin content averaged 103.3 micrograms per cc. At the end of this 7-day period, a similar culture to the one used above, except that no attempt was made to remove iron, was found to contain an average of only 17.5 micrograms per cc.

Other methods of controlling or limiting the iron content of the medium may be employed, the two mentioned above being merely suggestive. For example, the growth medium may be prepared by choosing its ingredients in the first instance each with sufficiently low iron content so that the aggregate will contain the amount desired for any particular conditions. Of the methods described above for the control of the iron concentration, the ion exchange procedure is preferred because it is the most applicable to commercial operations and avoids excessive handling and movement of materials. This method is also more economical because the ion exchange material is not used up and can be regenerated from time to time with any of the various acids, such as sulphuric, hydrochloric, nitric, and so forth.

In the growth mediums mentioned above, salts other than the ones indicated may be used to furnish the phosphorus, sulphur magnesium and nitrogen required, such as phosphoric acid and dipotassium phosphate for the phosphorus; sodium sulfate for the sulphur; magnesium chloride and magnesium nitrate for the magnesium; ammonium sulfate, ammonium nitrate, and ammonium chloride for the nitrogen. Ammonium phosphate may be used to supply both the nitrogen and the phosphorus; while potassium sulfate may be used to supply both potassium and sulphur. Also, the ammonium sulfate may be used to supply both nitrogen and sulphur. Although asparagin is a good source of organic nitrogen it is not absolutely necessary, and other materials may be used in its place, such as glutamic acid, hydrolyzed casein, and other amino acid containing compounds. Instead of glucose, other fermentable carbohydrates, such as xylose, arabinose, levulose, dextrose, sucrose, maltose, and mannitol.

Biotin, in any of the forms in which it may appear in nature, may be used, as well as purified forms, such as the free acid or methyl ester forms.

Having thus described our invention, we claim:

1. The method of producing high yields of riboflavin comprising cultivating under aerobic conditions Candida flareri in a growth medium containing a fermentable sugar, biotin, assimilable nitrogen, sulphur, phosphorus, and magnesium, and about 0.3 to 1.3 micrograms of iron per 100 cc. of the medium.

2. The method of producing high yields of riboflavin comprising cultivating Candida flareri in a growth medium which has been depleted of iron traces to the extent that it contains less than 1.3 micrograms per 100 cc. of the medium under aerobic conditions, said medium containing a fermentable sugar, biotin, and compounds containing assimilable nitrogen, sulphur, magnesium, and phosphorus.

3. The method of producing high yields of riboflavin comprising cultivating Candida flareri in a growth medium containing biotin, a fermentable sugar, assimilable nitrogen, sulphur, magnesium, and phosphorus, and minute traces of iron not substantially in excess of 1.3 micrograms per 100 cc.

4. The method of producing high yields of riboflavin comprising cultivating the organism Candida flareri in a growth medium containing biotin, a fermentable sugar, assimilable nitrogen, sulphur, magnesium, and phosphorus, and less than 10.3 micrograms of iron per 100 cc. of the growth medium.

5. The method of producing high yields of riboflavin comprising inoculating with Candida flareri a growth medium containing biotin, a fermentable sugar, assimilable nitrogen, sulphur, magnesium, and phosphorus, and less than 10.3 micrograms of iron per 100 cc. of the medium, permitting the inoculated medium to incubate under aerobic conditions, the while agitating the medium.

6. The method of producing high yields of riboflavin comprising cultivating Candida flareri in a growth medium containing biotin, a fermentable sugar, assimilable nitrogen, sulphur, magnesium, and phosphorus, and less than 10.3 micrograms of iron per 100 cc. of the medium, the while aerating the medium.

7. The method of producing high yields of riboflavin comprising cultivating Candida flareri in a growth medium containing biotin, a fermentable sugar, assimilable nitrogen, sulphur, magnesium, and phosphorus, and less than 10.3 micrograms of iron per 100 cc. of the medium, the while agitating and aerating the medium.

8. The method of producing high yields of riboflavin comprising cultivating under aerobic conditions *Candida flareri* in a growth medium that has been depleted of all iron traces in excess of 0.3 microgram per 100 cc. of medium and to which there has been subsequently added not more than 0.5 microgram of iron per 100 cc. of the medium, said medium containing also fermentable sugar, biotin, and compounds containing assimilable nitrogen, sulfur, magnesium, and phosphorus.

9. The method of producing high yields of riboflavin comprising cultivating under aerobic conditions *Candida flareri* in a growth medium that has been depleted of all iron traces in excess of about 0.3 to 1.3 micrograms per 100 cc. of the medium, said medium containing also fermentable sugar, biotin, and compounds containing assimilable nitrogen, sulfur, magnesium, and phosphorus.

FRED W. TANNER, Jr.
JAMES M. VAN LANEN.

REFERENCES CITED

The following references are of record in the file of this patent:

UNITED STATES PATENTS

| Number | Name | Date |
| --- | --- | --- |
| 2,363,227 | Burkholder | Nov. 21, 1944 |
| 2,326,425 | Arzberger | Aug. 10, 1943 |
| 2,369,680 | Meade | Apr. 17, 1945 |
| 2,370,177 | Legg | Feb. 27, 1945 |